UNITED STATES PATENT OFFICE.

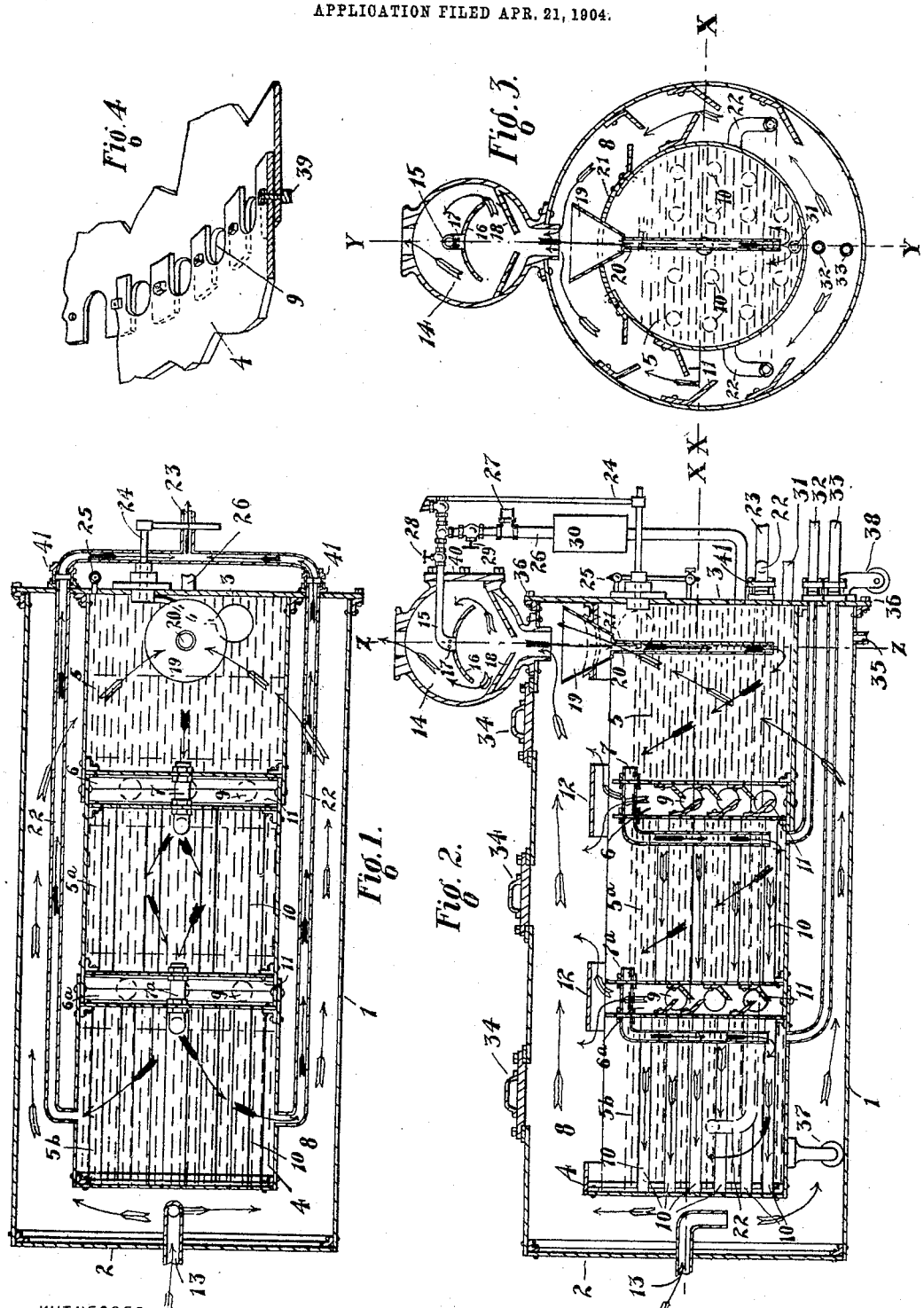

ANDREW WINTER, OF WEST COVINGTON, KENTUCKY.

WATER-HEATER.

No. 796,548.      Specification of Letters Patent.      Patented Aug. 8, 1905.

Application filed April 21, 1904. Serial No. 204,153.

*To all whom it may concern:*

Be it known that I, ANDREW WINTER, a citizen of the United States, residing at West Covington, in the county of Kenton and State of Kentucky, have invented certain new and useful Improvements in Water Heaters and Purifiers, of which the following is a specification.

My invention relates to improvements in water heaters and purifiers, and especially those in which exhaust-steam is used.

The object of my invention is to utilize the exhaust-steam from an engine or any steam-machine for the purpose of heating the water, separating the oil and impurities therefrom, and purifying the water for use in boilers and the like.

My invention consists of a closed chamber having within it steam and water pipes and steam and water chambers or spaces, steam-exhaust inlet, steam-exhaust outlet, steam-condensing chamber in the steam-outlet, a cold-water inlet through the steam-exhaust outlet, steam-breakers or baffle-plates, discharge-water pipes passing through the steam-chamber and meeting the suction-pipe on the outside of the chamber and provided with suitable automatic water-supply regulator, gage, and other features.

My invention also consists in the construction, combination, and arrangement of the several parts, as herein set forth and claimed.

In the accompanying drawings, which serve to illustrate my invention, Figure 1 is a horizontal longitudinal section on the line $x\ x$ of Fig. 3, showing also a top view of the automatic water-regulator, water-receiver, water-return pipe, water-circulating pipes, and gage. Fig. 2 is a longitudinal vertical section on the line $y\ y$ of Fig. 3, showing parts in side elevation. Fig. 3 is a vertical cross-section on the line $z\ z$ of Fig. 2 looking to the left. Fig. 4 is an enlarged detail view showing the joint of sections of the inner shell.

I prefer to construct my improved water heater and purifier substantially as follows:

The outer shell 1 is preferably formed cylindrical in shape, with a fixed head 2 in one end and a removable head 3 in the other end. Mounted within closed chamber or shell 1 and secured to the head 3 I provide a receptacle 4, having water-spaces 5, $5^a$, and $5^b$, separated from each other by steam-spaces 6 and $6^a$. The water-spaces 5, $5^a$, and $5^b$ are connected together near their tops by water-circulating pipes 7 and $7^a$, and the steam-spaces 6 and $6^a$ communicate with the steam-space 8, surrounding the sides and one end of the receptacle 4, by means of openings 9 and steam-tubes 10. Within the steam-spaces I arrange a series of baffle-plates 11, and over the top of each steam-space 6 and $6^a$ I secure steam deflectors or spreaders 12. Exhaust-steam is admitted through the steam-inlet 13 and circulates through the steam spaces and tubes, as indicated by the light arrows. The steam-condenser 14 is located at the top of one end of the shell and is preferably globe-shaped. The cold-water-supply pipe 15 extends into this steam-condenser and is provided on its inner end with a bell or dome shaped deflector 16. Above this dome in the cold-water pipe is a series of openings 17 to discharge jets of the incoming water and cause it to thoroughly commingle with and condense the outgoing steam. The steam-outlet, which also serves as the cold-water inlet, is also provided with steam and water breakers 18. Directly beneath the steam-outlet in the steam-space above the water-space 5 is a water-receiver 19, preferably funnel-shaped, with a tube 20 extending to near the bottom of the adjacent water-space and all supported on a shelf 21, secured to the head 3. The water-discharge pipes 22 lead out of each side of the water-space through the steam-space and through the removable head and are joined together to the suction-pipe 23 upon the outside of the chamber. These pipes 22 being double, the area of the suction-pipe into which they discharge causes a slow travel of the water, whereby it is heated to a higher temperature than otherwise, and at the same time prevents any suction within the water-heater.

A suitable automatic water-supply regulator 24 of any well-known construction is provided to maintain a given quantity of water at all times, and a suitable water-gage 25 is also used to show the stage or level of water.

When it is desired to utilize all of the escaping exhaust-steam for heating purposes, the incoming cold water is conducted directly into the lower part of the water-space through water-pipe 26, to which is connected a return-pipe 27 for the return of any exhaust-steam and its condensed product. This is regulated by valves 28 and 29. When condensing, the steam-valve 28 should be open and valve 29 closed. When using the steam for heating, close valve 28 and open valve 29. I provide an enlarged chamber 30 in the water-pipe 26 to permit of the expansion of the return condensation from the heating apparatus. Drain-pipes 31, 32, and 33 are provided near the bottoms of the respective water-spaces for the removal of sediment. These pipes are regulated by suitable valves. (Not shown).

The outer shell is provided at its top with suitable manholes 34 to permit easy access for cleaning and the like and at its bottom with a drain-pipe 35 to carry off the oil and other settlings, one end of the receptacle 4 being supported on wheel 37 and the other end and interior parts on the removable head 3. The entire inner structure is easily taken out for repairing by simply removing the bolts 36 and moving the structure forward on wheel 37 and wheels 38. The several sections of the receptacle 4 are cut away at intervals and secured together by bolts 39, as shown in Fig. 4. Plate 40 is removably secured to the steam-condensing chamber and permits access to the interior thereof.

The operation of my water heater and purifier is as follows: Introduce cold water from the water-pipe 15 into and through the condenser 14 and into receiver 19. The water passes down in the direction of the heavy arrows, depositing sediment in the bottom of water-space 5. The water circulates upwardly and passes through water-circulating pipe 7 to the bottom of water-space $5^a$, where further settling of sediment takes place. The water circulates around the steam-tubes in the water-space $5^a$, whereby it is heated and passes upwardly and out through circulating water-pipe $7^a$ to the bottom of water-space $5^b$, where any remaining sediment is deposited. The water is heated to still higher temperature in the water-space $5^b$, and the clear and purified water rises and passes out through discharge-pipes 22, as indicated by the heavy arrows, being still further heated while passing through the pipes in the steam-space. It is discharged from these pipes on the outside of the chamber into a suction-pipe 23, through which it is conveyed to the pump for use. As the water passes in the course described and as indicated by the heavy arrows the steam is admitted through exhaust-steam inlet 13 and circulates through the steam space and tubes in the manner indicated by the light arrows, heating the water by thus passing around and through it in the spaces and tubes, and at the same time coming in contact with the baffle-plates the oil is deposited thereon, drops to the bottom, and is drawn off. As the steam passes upwardly through the steam-spaces it is held from circulating rapidly by the baffle-plates and deflectors until it reaches the outlet, where it is met by a constant shower of water discharged from the cold-water-supply pipe, part of it discharging through the small openings, spreading over the dome, and falling in a shower to the plate below and part of it passing through the dome, and thus the outgoing steam is immersed with water and condensed. The water is dashed from the plate and again meets the steam and condenses it, immersing the steam as it passes from the outlet to the water-receiver. The supply of water is so regulated as to maintain a uniform level with a substantially constant inflow of water, so that steam passing outwardly will be substantially all condensed for heating and purifying the water in the receptacle to be used in boilers and the like. By introducing the cold water into the condensing-chamber a vacuum is produced and relieves the back pressure from the engine. When the cold water is passed through pipe 26, it causes a vacuum and reduces the back pressure on the return heating system, and by providing chamber 30 in pipe 26 any remaining steam left will expand and produce a cushion, which retards the force of the water in the water-space and prevents the sediment from being disturbed. The cold water coming in sudden contact with the heat of the steam will expand the water and relieve it of foreign matter, causing it to drop down through the receiver and deposit at the bottom of the water-space. As the exhaust-steam enters the steam-space the steam is expanded and frees most of the oil therefrom, the latter dropping to the bottom and the former circulating through the steam-spaces and steam-tubes and the clear steam passing into the condensing-chamber.

The discharge-pipes 22 are provided with stuffing-boxes 41, which act as expansion-joints in order to prevent straining or breaking. These pipes can be connected on the inside of the chamber at the bottom and when so constructed will require only one of the pipes extending through the head instead of two.

It will be seen that by an extremely simple and convenient construction and arrangement I am enabled to utilize the exhaust-steam for heating and purifying the water for use in boilers, also separating the oil, and when desired using the escaping exhaust-steam for heating and purifying the water.

From the above description it will be apparent that various changes in the construction may be made without departure from the scope and spirit of the invention—as, for instance, the shape of the shell and receptacle may be varied as well as the manner of securing the parts together.

An important advantage which I obtain is the arrangement by which the entire inner structure is removed by simply unfastening the removable head and pipe connections and drawing same forward.

What I claim, and desire to secure by Letters Patent, is—

1. In a water heater and purifier having a casing composed of a shell having permanent and removable heads, a series of alternately-disposed water and steam chambers therein rigidly secured to said removable head and having a space between them and said shell and permanent head, an exhaust-steam inlet to said space, steam-tubes connecting said steam-chambers to each other and to said space through the water-chambers, and means for circulating water and steam through said water and steam chambers for the purposes specified.

2. In a water heater and purifier having a casing composed of a shell with a removable head, water-chambers therein so disposed relative to said shell as to provide a steam-space within the shell and attached to said removable head, baffle-plates in said steam-space whereby steam is retarded and deposits oil therein, a drain-pipe for discharging said oil, a steam-inlet to said steam-space, steam-spaces between said water-chambers communicating with said steam-space, steam-tubes connecting said steam-spaces through said water-chambers, a steam-outlet to said steam-space, means for conducting water through said steam-outlet into said water-chambers whereby said steam is condensed and said water is heated and purified, a discharge-pipe and a sediment-pipe leading from said water-chambers through said steam-space and through said removable head, a cold-water pipe for conducting water into said water-chambers independently of said steam-outlet whereby the steam may be used for additional heating, the condensation and steam remaining after said additional heating being conducted into said water-chambers through said cold-water pipe, means for controlling the steam and water, and an expansion-chamber in said cold-water pipe whereby said steam and condensation is prevented from disturbing sediment in said water-chambers.

3. In a water heater and purifier, a casing, water-chambers surrounded by a steam-space therein, steam-spaces separating the water-spaces from each other and having openings into the surrounding steam-space, steam-tubes extending through said water-chambers and connecting the steam-spaces together, baffle-plates in said steam-spaces to retard rapid circulation of steam, and means for discharging the purified water.

4. In a water heater and purifier, a casing, water-chambers surrounded by a steam-space therein, steam-spaces separating the water-chambers from each other and having openings into the surrounding steam-space, steam-tubes extending through said water-chambers and connecting the steam-spaces together, baffle-plates in said steam-spaces, steam-deflectors over said steam-spaces, an exhaust-steam inlet to said surrounding steam-space, a water-inlet to said water-chambers communicating therewith through a condensing-chamber and means for circulating, settling and discharging the water entering said water-chambers through said condensing-chamber.

5. In a water heater and purifier, a chamber, water and steam spaces therein, steam-exhaust inlet, steam-condensing chamber and outlet, a cold-water inlet adapted to receive and discharge cold water therein and immerse and condense the steam, steam and water breakers and spreaders within said condensing-chamber, a water-receiver beneath said condenser and separated therefrom by a steam-space, a water-pipe adapted to convey the water from the receiver to the bottom of the water-space, pipes adapted to convey the water from one water-space to another, steam-tubes within the water, and means for discharging the water.

6. In a water heater and purifier, a chamber, water-spaces therein, steam-spaces adapted to separate said water-spaces from each other and a steam-space surrounding said water and steam spaces except at the front end, baffle-plates in said steam-spaces and means for heating, settling and discharging the water.

7. In a water heater and purifier, a chamber, water-spaces, steam-spaces adapted to separate said water-spaces from each other, deflectors above said steam-spaces, steam-exhaust inlet, steam-condenser, cold-water inlet, means for circulating the water, and means for heating, settling and discharging the water.

8. In a water heater and purifier, a chamber, a fixed head in one end of said chamber and a removable head in the other end thereof, a receptacle in said chamber supported at one end upon a wheel and at its other end upon the removable head, wheels attached to the outside of said removable head whereby the receptacle and connecting parts are removable by merely disconnecting the removable head and connected pipes and drawing the same forward.

9. In a water heater and purifier, a chamber, water and steam spaces therein, steam-exhaust inlet, condensing-chamber, cold-water inlet, means for circulating, heating and settling the water therein, discharge-pipes extending through the steam-space connected together on the outside and adapted to discharge into the suction-pipe.

10. In a water heater and purifier, a chamber, a receptacle therein made up of sections bolted together, each section having its adjacent ends cut out to form a series of perforations when the ends of the adjacent sections are overlappped and bolted together.

11. In a water heater and purifier, a chamber, steam and water spaces therein, steam-exhaust inlet a combined cold-water inlet and steam-outlet, a separate water-inlet, means for conveying, circulating, heating, settling and discharging the water, and means for discharging the steam.

12. In a water heater and purifier, a chamber, steam and water spaces, steam-exhaust inlet, steam-outlet, cold-water-supply pipe, a return-pipe for steam and water connected thereto, and an expansion-chamber also in said cold-water pipe between the return-pipe and the water-space within the chamber, to serve as a cushion to prevent the sediment from being disturbed.

ANDREW WINTER.

Witnesses:
 JAMES N. RAMSEY,
 C. W. EARNIST.